United States Patent [19]

Donovan et al.

[11] Patent Number: 5,463,033
[45] Date of Patent: Oct. 31, 1995

[54] FIBER REACTIVE MONOAZO YELLOW DYE

[75] Inventors: John W. Donovan, Greene, R.I.; Frank P. Lavieri, Foxboro, Mass.

[73] Assignee: Hoechst Celanase Corporation, Somerville, N.J.

[21] Appl. No.: 274,567

[22] Filed: Jul. 13, 1994

Related U.S. Application Data

[63] Continuation of Ser. No. 144,591, Oct. 28, 1993, abandoned, which is a continuation of Ser. No. 867,260, Apr. 10, 1992, abandoned.

[51] Int. Cl.[6] .......................... C09B 62/51; D06P 1/384
[52] U.S. Cl. .................................. 534/642; 8/549
[58] Field of Search ........................ 534/642; 8/549

[56] References Cited

U.S. PATENT DOCUMENTS

| | | | |
|---|---|---|---|
| 4,046,754 | 9/1977 | Meininger et al. | 534/642 |
| 4,963,661 | 10/1990 | Tappe et al. | 534/642 |
| 5,082,963 | 1/1992 | Phillips et al. | 534/642 X |
| 5,131,194 | 7/1992 | Kelley | 8/449 |
| 5,131,918 | 7/1992 | Kelley | 8/549 |

FOREIGN PATENT DOCUMENTS 785284 5/1968 Canada ................... 534/642

343262 11/1989 European Pat. Off. ............... 534/642

*Primary Examiner*—Jacqueline Haley
*Assistant Examiner*—Fiona T. Powers
*Attorney, Agent, or Firm*—Hugh C. Crall

[57] ABSTRACT

A monoazo fiber reactive dye of the formula:

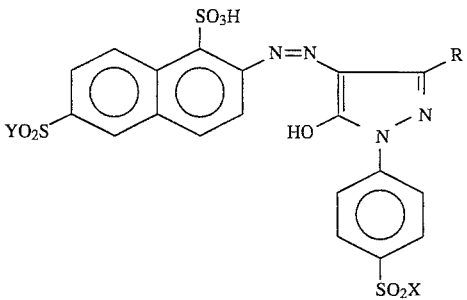

wherein X and Y are independently selected from β-sulfatoethyl, β-thiosulfatoethyl and β-phosphatoethyl group and R is hydrogen, and $C_1-C_4$ alkyl; preferably methyl. These dyes are useful in conducting exhaust dyeings at low dye bath salt concentrations.

6 Claims, No Drawings

FIBER REACTIVE MONOAZO YELLOW DYE

This is a continuation of application Ser. No. 08/144,591 filed on Oct. 28, 1993, now abandoned which is a continuation of U.S. Ser. No. 07/867,260 filed on Apr. 10, 1992 now abandoned.

BACKGROUND OF THE INVENTION

1. Technical Field

This invention is directed to the field of fiber reactive (vinyl sulfone) monoazo dyes.

2. Background

The exhaust method of dyeing is a batch method comprising the immersion of the textile goods in an aqueous solution of dye and various dyeing auxiliary chemicals. The goods are held in the dye bath for a predetermined time usually at an elevated temperature until the dye migrates into and fixes to the fiber. The exhaust dyeing method is well known in the art of coloring textiles; exemplary exhaust dyeing procedures are beck, jig, jet and circulating liquor machine procedures.

In the exhaust dyeing method using fiber reactive vinyl sulfone dyes, one necessary auxiliary chemicals is an electrolyte which is added to the dye bath to force the dye to migrate from the solution to the fiber. The most commonly used electrolyte is an inorganic salt such as sodium sulfate or sodium chloride. In exhaust dyeing procedures, this electrolyte is generally employed in amounts from about 20–50 grams per liter to about 100 grams per liter of dye bath with the amount of electrolyte with these ranges being proportionally higher as the dye concentration increases. However, a few fiber reactive dyes are known which are used at reduced electrolyte concentration. After the dyeing process is completed, the exhausted dye bath solution is discharged to waste water treatment facilities for removal of electrolyte and other residual dye bath chemicals.

The present invention provides a select class of dyes which can be used for the exhaust dyeing of textiles at significantly lower levels of electrolyte in the dye bath with the attendant reduction in raw materials costs, reduced chemical discharge to the environment and reduced waste water treatment costs. An additional advantage is that the dye of the invention unexpectedly gives a higher dyeing efficiency as evidenced by the achievement of higher dye build up values.

U.S. Pat. No. 4,963,661 discloses a dye having a structural formula similar to the dyes of this invention. However, the structurally similar prior art dye of U.S. Pat. No. 4,963,661 does not provide the advantages of this invention.

SUMMARY OF THE INVENTION

The invention provides a dye for the exhaust dyeing of materials having hydroxy groups and materials containing carbonamide groups using a low salt content dye bath in conjunction with the fiber reactive vinyl sulfone dye of the invention having the general formula:

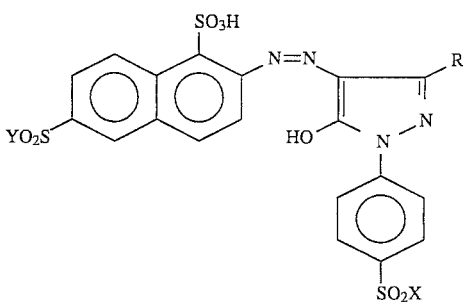

wherein X and Y are independently, a vinyl group or a fiber reactive group of the general formula —$CH_2CH_2$—Z wherein, "Z" is selected from chloro, β-sulfatoethyl, β-thiosulfatoethyl and β-phosphatoethyl group, preferably the β-sulfatoethyl group and R is hydrogen, and $C_1$–$C_4$ alkyl; preferably methyl.

The dyes of the above formula can be used in exhaust dyeing procedures at dye bath salt concentration between 4 and 5 times lower than those salt concentration conventionally employed in exhaust dyeing procedures while at same time providing high color yield in the dyed fabric.

DESCRIPTION OF THE PREFERRED EMBODIMENTS

Fiber reactive dyes of the vinyl sulfone type are well known in the field of textile dyeing. This invention is that of a fiber reactive dye useful in the exhaust method of dyeing textiles using a low inorganic salt content dye bath. The invention also provides a dyeing process with other advantages which will be obvious from the following description.

The select group of vinyl sulfone dyes useful in the present invention may be represented in their free acid form by the general formula:

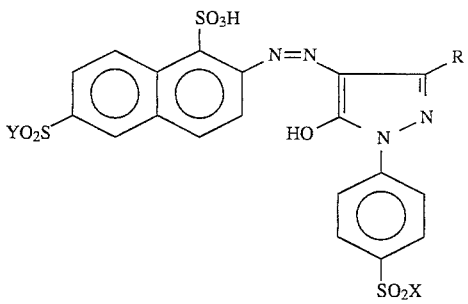

wherein:

X and Y are independently a vinyl group, or a fiber reactive group of the general formula —$CH_2CH_2$—Z wherein Z is selected from chloro, sulfato, thiosulfato or phosphato, most preferably sulfato and R is $C_1$–$C_4$ alkyl, preferably methyl.

The above dyes are characterized by having at least two fiber reactive vinyl sulfone groups and an alkyl substituted pyrazolone substituent. The dyes of the invention may be prepared in accordance with the general procedures set forth in U.S. Pat. No. 4,963,661; the teachings of which are hereby incorporated by reference.

In the exhaust dyeing method, the textile substrate (e.g. fiber, yarn fabric, carpet etc.) is treated in an alkaline aqueous solution of the fiber reactive dye in the presence of a substantially neutral inorganic salt electrolyte such as sodium chloride, sodium sulfate or Glauber salt which are the most commonly used inorganic salts. However, in principle, any non-reactive inorganic salt having sufficient water solubility and purity can be used such as potassium chloride, potassium sulfate, potassium nitrate etc. Economics generally dictate the uses of the less expensive salts such as sodium sulfate and sodium chloride.

The invention is useful in the dyeing of natural and synthetic materials containing hydroxy groups and materials containing carbonamide groups. Materials containing hydroxy groups are exemplified by materials such as cotton, linen, hemp, jute, rayon and viscose rayon. Materials containing carbonamide groups are the synthetic and natural polyamides and polyurethanes, for example synthetic nylons such as nylon 6, nylon 6-6, nylon 11 and the natural materials such as wool, silk, leather.

The exhaust dyeing procedure is well known. It is carried out in an aqueous bath at temperatures typically between 40° C. to 105 ° C., usually at the boil. The exhaust dyeing process may be conducted using a liquor ration of about 1:3 to about 1:10 (weight of goods to weight of dye liquor). In the commercial exhaust dyeing practice, a liquor ratio from about 1:5 to about 1:10 is used; normally about 1:10. Additional dyeing auxiliaries appropriate to the circumstance may be added to the dye bath such as leveling agents, surfactants, buffers, water softeners etc.

A typical procedure for the dyeing of a cellulosic fiber such as cotton follows. The amount of dye, inorganic salt (NaCl) and alkali are represented by the letters x, y and z, respectively. The fabric is prescoured or bleached and then the residual alkali is neutralized at 140° F. using acetic acid. The dye bath temperature is set at 80° F. and the auxiliary chemicals and x% of dye are added to the dye bath water. The water being present at a liquor ratio of 1:10. The bath is held ten minutes and then y grams/liter of sodium chloride are added. The bath is again held for ten minutes and z% alkali is added. The amount of inorganic salt (y) and alkali (z) used are dependent upon the amount of dye (x) used as seen in Table I, below. The bath is heated to 140° F. at a rate of 2° F. per minute and held at 140° F. for 45 minutes and then discharged. The bath is next filled with water, held ten minutes at 120° F. and discharged. The bath is then filled with water, neutralized at 120° F. using 56% acetic acid, held ten minutes and discharged. The fabric is given a final rinse at 120° F. with water. This dyeing procedure was used to dye the test specimens in the examples that follow. The color yield on the final product was determined using a computer assisted spectro photometric measurement technique which is well known in the industry and expressed as color density units (CDU).

In the exhaust dyeing process, the amount of inorganic salt used to accelerate exhaustion of the dye bath varies depending upon the concentration of the dye employed in the dyeing. Generally, the lower the concentration of the dye the lower the inorganic salt content of the dye bath. Typically in the dyeing of cellulosic fibers such as cotton the following amount of salt would be used with corresponding dye concentration:

TABLE I

Requirements for Cotton 100%
(Conventional)

| % Dye* | Sodium Chloride g/l | Soda Ash % | 50% Caustic Soda % |
|---|---|---|---|
| 0–.5 | 20–50 | 5 | — |
| .5–2 | 80 | 5 | 1.0 |
| 2–4 | 100 | 5 | 2.0 |
| 4–6 | 100 | 5 | 2.5 |

*% Dye based upon weight of fabric as 100 percent dye content.

According to the invention, the same dyeing procedure can be used. However, when this procedure is used in conjunction with the previously described dyes of the invention, the amount of electrolyte can be reduced to those amounts as shown in Table II:

TABLE II

Requirements for Cotton 100%
(The Invention)

| % Dye* | Sodium Chloride g/l | Soda Ash % | 50% Caustic Soda % |
|---|---|---|---|
| 0–.5 | 10–15 | 5 | — |
| .5–2 | 25–50 | 5 | 1.0 |
| 2–4 | 25–50 | 5 | 2.0 |
| 4–6 | 25–50 | 5 | 2.5 |

*% Dye based upon weight of fabric as 100 percent dye content.

In the above tables, the soda ash and caustic additives provide the alkalinity necessary to convert the vinyl sulfone dye to its fiber reactive state. The following examples illustrate the invention. Percentage values are percent by weight in this specification and the claims unless otherwise noted. Dye concentrations are likewise percent weight as 100 percent dye.

EXAMPLE 1 (PRIOR ART)

To 639.4 parts of an aqueous solution containing 14.5 parts of 1-{4'-(β-sulfatoethylsulfonyl)-phenyl} -3-carbethoxypyrazol-5-one was added 18.0 parts of the diazonium salt prepared from 2-amino-1-sulfo-naphthalene-6-(β-sulfatoethylsulfone). The pH of the coupling reaction was maintained at 4 to 5 by the addition of 8.8 parts of sodium carbonate. 140 parts of sodium chloride was added and the precipitated product isolated by filtration. The resulting moist cake was dried at sixty degrees Centigrade to yield 61.0 parts of a yellowish powder which had a maximum absorbance of 0.51 6 at a wave length of 434 nanometers. The powder so obtained had an HPLC assay of 87.0 by area percent.

This dye had the following structure:

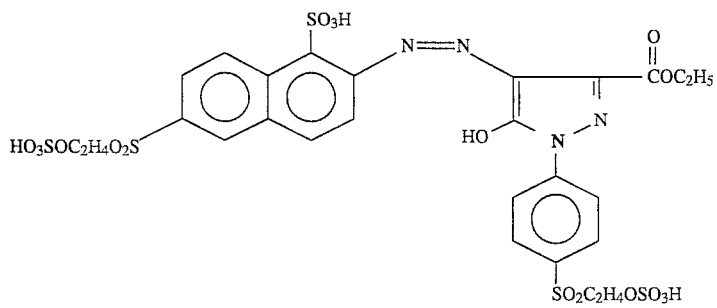

EXAMPLE 2 (THE INVENTION)

To 325.9 parts of an aqueous solution containing 36.2 parts of 1-{4'-(β-sulfatoethylsulfonyl)-phenyl} -3-methylpyrazol-5-one was added 52.0 parts of the diazonium salt prepared from 2-amino-1-sulfo-naphthalene-6-(β-sulfatoethylsulfone). The pH of the coupling reaction was maintained at 4 to 5 by the addition of 17.5 parts of sodium carbonate. The resulting aqueous solution was dried at sixty degrees Centigrade to yield 114.6 parts of a yellowish powder which had a maximum absorbance of 0.525 at a wave length of 401 nanometers. The powder so obtained had an HPLC assay of 90.0 by area percent.

This dye had the following structure:

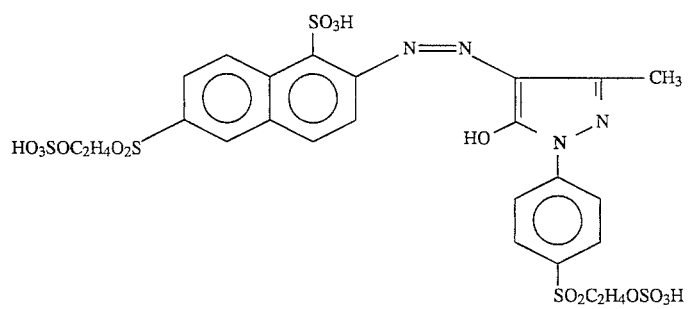

COLOR BUILD UP COMPARISON

The build up curves were obtained from dyeings prepared substantially in accordance with the exhaust dyeing procedure previously described. In summary, the exhaust dyeings were carried out at a liquor ratio of 1:10, using the temperature rise method (2°/min) at 140° F. and using a mixture of sodium carbonate/sodium hydroxide as the alkali. The % dye refers to the amount of dye as a percentage on the weight of fabric. CDU refers to Color Density Unit and is a measure of the color strength of the fabric after dyeing.

| % Dye | Salt g/l | Invention CDU | Prior Art CDU | % Difference* PA/INV |
|---|---|---|---|---|
| BUILD UP DATA (Recommended Salt Amounts) | | | | |
| 0.2% | 50 | 0.1269 | 0.1125 | 88.7% |
| 0.5% | 50 | 0.2800 | 0.2169 | 77.5% |
| 1.0% | 80 | 0.5304 | 0.5040 | 95.0% |
| 2.0% | 80 | 0.9403 | 0.8768 | 93.2% |
| 4.0% | 100 | 1.5154 | 1.5170 | 100.1% |
| 6.0% | 100 | 1.8221 | 1.6228 | 89.1 |
| BUILD UP DATA (Reduced Salt Amounts) | | | | |
| 0.2% | 15 | 0.1163 | 0.0844 | 72.5% |
| 0.5% | 30 | 0.2610 | 0.1851 | 70.9% |
| 1.0% | 50 | 0.4938 | 0.4135 | 83.7% |
| 2.0% | 50 | 0.8761 | 0.7171 | 81.9% |
| 4.0% | 70 | 1.3957 | 1.2676 | 90.8% |
| 6.0% | 70 | 1.7557 | 1.5697 | 89.4% |
| BUILD UP DATA (Highly Reduced Amounts) | | | | |
| 0.2% | 10 | 0.1121 | 0.0734 | 65.4% |
| 0.5% | 20 | 0.2514 | 0.1647 | 65.5% |
| 1.0% | 25 | 0.4404 | 0.3300 | 74.9% |
| 2.0% | 25 | 0.7945 | 0.5752 | 72.4% |
| 4.0% | 25 | 1.2900 | 0.9924 | 76.9% |
| 6.0% | 25 | 1.6054 | 1.2509 | 77.9% |

*Expressed as ratio of Prior Art/Invention Color Strength (Build Up)

The fastness properties of both dyes are similar and essentially equal. In the build up under the recommended standard conditions the two dyes also behave similarly. The superior build up of the invention under reduced salt dyeing conditions was an unexpected and significant advantage. The terms "reduced salt amount" and "highly reduced salt amount" mean the salt concentrations expressed in the titled tables above.

We claim:

1. A compound of the formula:

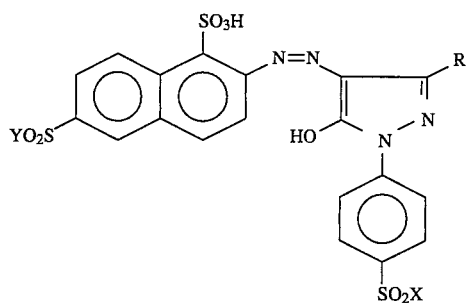

X and Y are independently a vinyl group, or a fiber reactive group of the general formula —CH$_2$CH$_2$—Z wherein Z is chloro, sulfato, thiosulfato or phosphato, and R is C$_1$–C$_4$ alkyl.

2. A compound according to claim 1 wherein X and Y are —CH$_2$CH$_2$—Z and Z is sulfato.

3. A compound according to claim 2 wherein R is methyl.

4. A process of dyeing a substrate having hydroxy and/or carbonamide substituents comprising contacting said substrate with a compound according to claim 1 under exhaust dyeing conditions using no more than a reduced salt amount.

5. A process for dyeing a substrate having hydroxy and/or carbonamide substituents comprising contacting said substrate with a compound according to claim 1 under exhaust dyeing conditions using no more than a reduced salt amount; wherein the substituents X and Y are —CH$_2$CH$_2$—Z.

6. A process of drying a substrate having hydroxy and/or carbonamide substituents comprising contacting said substrate with a compound according to claim 1 under exhaust dyeing conditions using no more than a reduced salt amount; wherein the substituents X and Y are —CH$_2$CH$_2$—Z and the substituent R is methyl.

* * * * *